US012625580B2

(12) United States Patent
Yun et al.

(10) Patent No.: US 12,625,580 B2
(45) Date of Patent: May 12, 2026

(54) TOUCH DETECTION DEVICE CAPABLE OF SUPPRESSING EMI EFFECT

(71) Applicant: G2touch Co., Ltd., Seongnam-si (KR)

(72) Inventors: Dong-Won Yun, Seongnam-si (KR);
Hyung-Ki Jin, Seongnam-si (KR)

(73) Assignee: G2touch Co., Ltd., Seongnam-si (KR)

( * ) Notice: Subject to any disclaimer, the term of this patent is extended or adjusted under 35 U.S.C. 154(b) by 0 days.

(21) Appl. No.: 19/017,795

(22) Filed: Jan. 13, 2025

(65) Prior Publication Data

US 2025/0315126 A1     Oct. 9, 2025

(30) Foreign Application Priority Data

Apr. 3, 2024     (KR) ........................ 10-2024-0045529

(51) Int. Cl.
*G06F 3/041*     (2006.01)
*G06F 3/044*     (2006.01)
(52) U.S. Cl.
CPC ........ *G06F 3/04166* (2019.05); *G06F 3/0446* (2019.05); *G06F 2203/04107* (2013.01)
(58) Field of Classification Search
CPC ....... G06F 2203/04107; G06F 3/04166; G06F 3/0446
See application file for complete search history.

(56) References Cited

U.S. PATENT DOCUMENTS

| | | | |
|---|---|---|---|
| 2023/0100570 A1* | 3/2023 | Sadeghipour | ......... G06F 3/0418 |
| 2024/0069674 A1* | 2/2024 | Hong | .................. G06F 3/04166 |
| 2024/0077973 A1* | 3/2024 | Kim | .................... G06F 3/04164 |
| 2024/0329774 A1* | 10/2024 | Hong | .................... G06F 3/0443 |

FOREIGN PATENT DOCUMENTS

| | | |
|---|---|---|
| KR | 20160094569 A | 8/2016 |
| KR | 20220017330 A | 2/2022 |
| KR | 20220138506 A | 10/2022 |
| KR | 20240031526 A | 3/2024 |

* cited by examiner

*Primary Examiner* — Hong Zhou
(74) *Attorney, Agent, or Firm* — NKL Law; Jae Youn Kim

(57)     ABSTRACT

A touch detection device includes a panel including a plurality of electrodes regularly arranged in rows and columns, a switch connected to electrodes arranged in a specific column through connection lines, and a sensor driving unit operably coupled to the switch and configured to perform a control operation so that a driving signal of a voltage waveform of a specific cycle is applied to the electrodes. Lengths of the connection lines are differently set according to positions of electrodes arranged in a specific row. The sensor driving unit applies a second driving signal of a reverse voltage waveform to an electrode of one of two rows adjacent to the specific row when an amount of electromagnetic interference (EMI) radiation of a specific connection line to which the driving signal is applied is less than or equal to a threshold.

10 Claims, 5 Drawing Sheets

(a)                              (b)

TOUCH DETECTION DEVICE CAPABLE OF SUPPRESSING EMI EFFECT

BACKGROUND OF THE INVENTION

Field of the Invention

The present invention relates to a method of driving a touch panel, and more particularly to a touch panel detection device capable of suppressing an EMI effect.

Description of the Related Art

Electromagnetic interference (EMI) is undesired noise or interference in an electrical path or circuit caused by a source, and is also referred to as radio frequency interference. EMI may cause electronic devices to improperly work, malfunction, or stop working completely. EMI may occur due to a natural or man-made source, and an EMI effect may be reduced using a high-quality electronic device, electrical shielding, and modern error correction. General examples of EMI include electrical noise that is heard when a mobile phone is placed near powered audio equipment or speakers.

Electric current, which is movement of an electric charge, creates a magnetic field, and a moving magnetic field creates an electric current. An electrical conductor may act as an antenna for radio waves. High-power electrical and radio sources may have undesired effects on devices located far away. As electronic devices become smaller, faster, more compact, and more sensitive, the electronic devices become more susceptible to effects of radio waves, which generates EMI.

This EMI may result from several sources. For example, high-power radio and electrical sources may cause undesired EMI. Improperly designed consumer electronic devices may cause EMI in other devices.

Meanwhile, a touch panel includes a plurality of electrodes. An object such as a finger or a stylus provides input by changing capacitance between electrodes included in the touch panel. In order for the touch panel to detect the input provided by the object, a driving circuit needs to apply a driving signal. However, there is a problem in that EMI formed by the driving signal affects the plurality of electrodes and/or a plurality of driving circuits in the panel, so that detection performance deteriorates.

In addition, in touch driving in the panel, a plurality of touch cells determines a quantity of electric charges of a capacitor through a voltage alternating current operation to recognize touch input. In this process, an electric field and a magnetic field are formed due to the voltage alternating current operation, which generates EMI. In particular, as the touch area increases, the number of touch cells operating at alternating current increases, and thus the EMI effect accelerates. In particular, application of a large touch sensor panel (TSP) is difficult, and the worst result is obtained in terms of EMI risk.

SUMMARY OF THE INVENTION

A task to be solved by the present invention is to solve such difficulties. A task to be solved by the present invention is to provide a method of driving a touch panel capable of reducing an EMI effect in the touch panel.

A task to be solved by the present invention is to alleviate a problem that an amount of EMI radiation is different in magnitude for each sensing column since resistance and capacitance components of touch cells in a panel deviate more as the panel becomes larger.

A task to be solved by the present invention is to provide a method of driving a touch panel capable of reducing an EMI deviation effect in the touch panel.

However, the tasks to be solved by the present invention are not limited to the technical tasks mentioned above, and other technical tasks not mentioned herein may be clearly understood by a person having ordinary knowledge in the field from the description of the present invention.

In accordance with the present invention, the above and other objects can be accomplished by the provision of a touch detection device including a plurality of electrodes regularly arranged in rows and columns, a switch connected to electrodes arranged in a specific column through connection lines, and a sensor driving unit operably coupled to the switch and configured to perform a control operation so that a driving signal of a voltage waveform of a specific cycle is applied to the electrodes. Lengths of the connection lines are differently set according to positions of electrodes arranged in a specific row. The sensor driving unit applies a second driving signal of a reverse voltage waveform to an electrode of one of two rows adjacent to the specific row when an amount of electromagnetic interference (EMI) radiation of a specific connection line to which the driving signal is applied is less than or equal to a threshold.

According to an embodiment, the sensor driving unit applies the second driving signal and a third driving signal of the reverse voltage waveform to electrodes of the two rows adjacent to the specific row, respectively, when the amount of EMI radiation of the specific connection line exceeds the threshold.

According to an embodiment, the sensor driving unit may apply the second driving signal of the reverse voltage waveform to the electrode of the one of two rows adjacent to the specific row when a length of the specific connection line is greater than or equal to a critical length, and apply the second driving signal and the third driving signal of the reverse voltage waveform to the electrodes of the two rows adjacent to the specific row, respectively, when the length of the specific connection line is less than the critical length.

According to an embodiment, when a length of the specific connection line is greater than or equal to the critical length, the driving signal of the voltage waveform may be a square wave signal having a first slew rate at a rising edge. When the length of the specific connection line is less than the critical length, the driving signal of the voltage waveform may be a square wave signal having a second slew rate greater than the first slew rate at a rising edge.

According to an embodiment, the sensor driving unit may detect a rising edge and a falling edge of the driving signal of the voltage waveform for each specific row, and perform a control operation so that time points of a second falling edge and a second rising edge of the second driving signal match and correspond to time points of the rising edge and the falling edge of the driving signal of the voltage waveform for each specific row when the length of the specific connection line is greater than or equal to the critical length.

According to an embodiment, the sensor driving unit may detect a rising edge and a falling edge of the driving signal of the voltage waveform for each specific row, perform a control operation so that time points of a second falling edge and a second rising edge of the second driving signal match and correspond to time points of the rising edge and the falling edge of the driving signal of the voltage waveform for each specific row when the length of the specific connection line is less than the critical length, and perform a control operation so that time points of a third falling edge and a third rising edge of the third driving signal match and correspond to time points of the rising edge and the falling edge of the driving signal of the voltage waveform for each specific row when the length of the specific connection line is less than the critical length.

According to an embodiment, the sensor driving unit may detect a rising edge and a falling edge of the driving signal of the voltage waveform for each specific row, detect a first area between the rising edge and the falling edge, and cancel out an EMI component of the voltage waveform by changing a second area of the second driving signal of the reverse voltage waveform to correspond to the first area.

According to an embodiment, the switch may include a first switch connected to electrodes of a first column, a second switch connected to electrodes of a second column adjacent to the first column, a third switch connected to electrodes of a third column adjacent to the second column, and a fourth switch connected to electrodes of a fourth column adjacent to the third column.

According to an embodiment, the sensor driving unit may detect a row and a column corresponding to a position where touch input is applied to the panel, and apply driving signals of different voltage waveforms to electrodes in adjacent rows through switches corresponding to the detected column among the first to fourth switches, and at least one of the driving signals of the different voltage waveforms is the second driving signal of the reverse voltage waveform.

According to an embodiment, when the length of the specific connection line is greater than or equal to the critical length, the sensor driving unit may apply the second driving signal of the reverse voltage waveform to a second connection line adjacent to the specific row and shorter than the connection line.

According to an embodiment, the sensor driving unit may apply the second driving signal of the reverse voltage waveform to the second connection line shorter than the connection line among the two rows adjacent to the specific row when the length of the specific connection line is less than the critical length, determine whether the amount of EMI radiation of the specific connection line is greater than or equal to a threshold when the driving signal and the second driving signal are applied, and apply the third driving signal of the reverse voltage waveform to a third connection line longer than the connection line among the two rows adjacent to the specific row when the amount of EMI radiation of the specific connection line is greater than or equal to the threshold.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
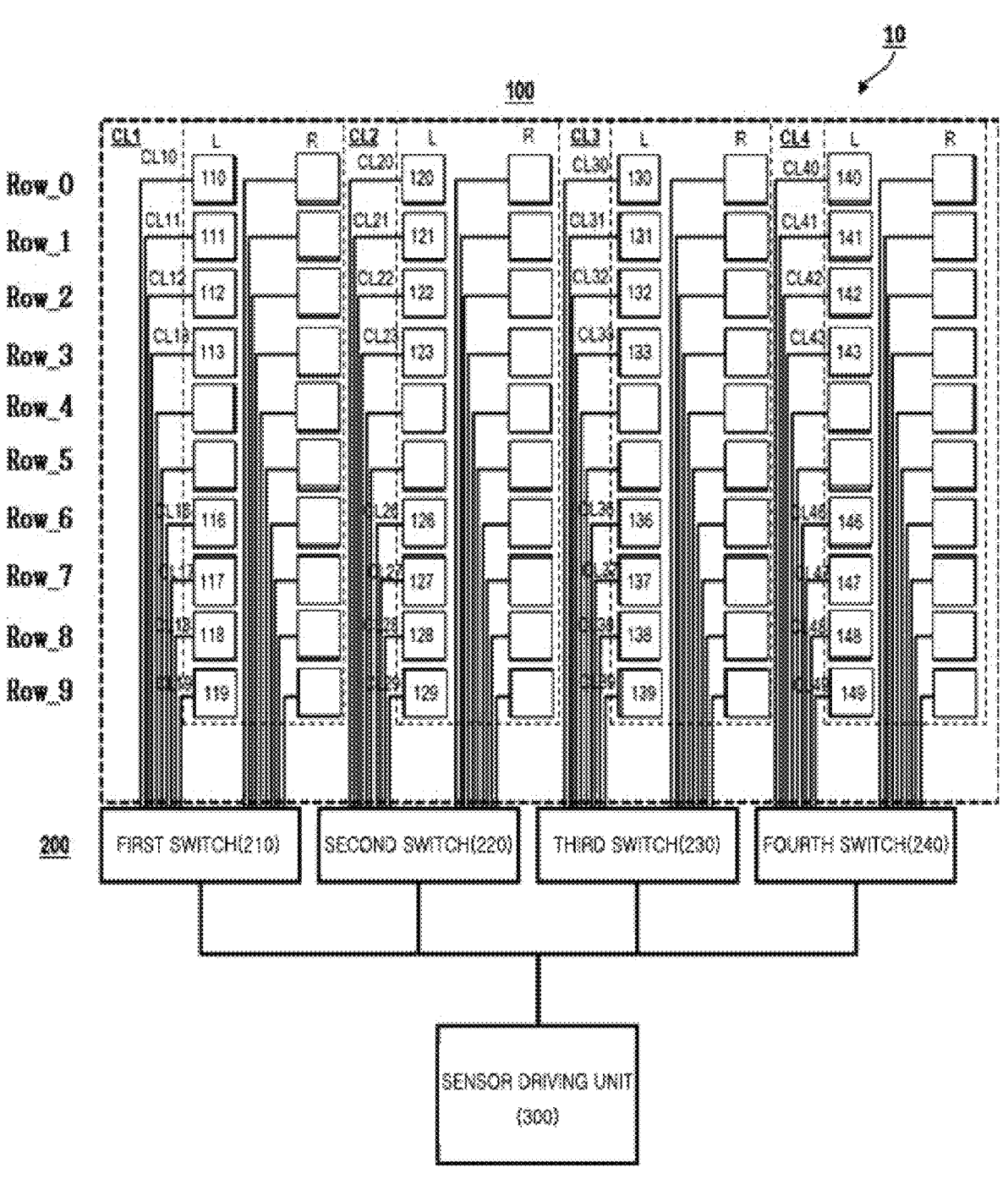
FIG. 1 is a block diagram illustrating a detailed configuration of a touch detection device according to the present invention.

Hereinafter, preferred embodiments of the present invention will be described in detail with reference to the attached drawings. Prior thereto, terms or words used in this specification and claims should not be construed as limited to usual or dictionary meanings, and should be interpreted as having meanings and concepts consistent with the technical idea of the present invention based on the principle that an inventor may appropriately define a concept of a term to describe the invention of the inventor in the best way possible. Therefore, the embodiments described in this specification and the configurations shown in the drawings are only one of the most preferred embodiments of the present invention and do not represent the entire technical idea of the present invention. Thus, it should be understood that, at the time of filing this application, there may be various equivalents and modifications that can replace the embodiments and configurations.

FIG. 1 is a block diagram illustrating a detailed configuration of a touch detection device according to the present invention. Referring to FIG. 1, the touch detection device 10 may include a panel 100, a switch 200, and a sensor driving unit 300.

The touch detection device 10 may include the panel 100 including a plurality of electrodes regularly arranged in rows and columns, the switch 200 for electrically connecting some of the electrodes to form a plurality of sensing channels 110a to 110d, and the sensor driving unit 300 for providing driving signals to the sensing channels 110a to 110d. The sensor driving unit 300 may perform a control operation so that the same or different driving signals are output to different sensing channels. The sensor driving unit 300 may perform a control operation so that the timing of rising/falling edges are different between adjacent rows, or may perform a control operation so that signals of voltage waveforms in opposite directions are applied as described below.

As illustrated in FIG. 1, the panel 100 according to the present invention may be a self-dot type panel. In the self-dot type panel 100, a plurality of electrodes is regularly arranged in rows and columns. As illustrated in FIG. 1, the electrodes may be rectangles. According to an embodiment not illustrated, the electrodes may each have a shape such as a rhombus or a triangle, and may be complementarily arranged with electrodes in adjacent rows or columns.

The plurality of electrodes may function as a single electrode forming a capacitor with an object such as a finger or a stylus providing touch input. As the object approaches the panel 100 having the plurality of electrodes, the capacitance of the capacitor formed with the electrodes increases. On the other hand, as the object moves away from the panel 100 having the plurality of electrodes, the capacitance of the capacitor formed with the electrodes decreases.

The switch 200 may include a plurality of switches 210 to 240. The plurality of switches 210 to 240 may be implemented as multiplexers or may be implemented so that only electrodes of some channels are connected.

A plurality of electrodes is connected to the switch 200 via conductive wires. The switch 200 connects the plurality of electrodes in rows or columns to form the sensing channels

110*a* to 110*d*. In the embodiment illustrated in FIG. 1, the plurality of electrodes is connected in a column direction to form the sensing channels 110*a* to 110*d*. In an embodiment not illustrated, the plurality of electrodes may be connected in rows to form sensing channels.

The sensor driving unit 300 provides a driving signal to the sensing channels 110*a* to 110*d* to detect touch input by the object. The embodiment illustrated in FIG. 1 illustrates an example in which a single driving unit detects touch input on one panel 100. However, the present invention is not limited thereto, and a separate main control unit (not shown) may control a plurality of sensor driving units, and each sensor driving unit may drive the sensing channels 110*a* to 110*d*.

The sensor driving unit 300 may provide the same driving signal to a left column (L) and a right column (R) included in the sensing channels 110*a* to 110*d*. For example, the sensor driving unit 300 may synchronize a rising edge of a driving signal provided to the left column (L) with a rising edge of a driving signal provided to the right column (R). A falling edge of the driving signal provided to the left column (L) and a falling edge of the driving signal provided to the right column (R) may be synchronized with each other. However, the present invention is not limited thereto. For example, the sensor driving unit 300 may provide a phase difference between driving signals provided to one sensing channel 110 and another adjacent sensing channel so that the same edges do not overlap each other.

The sensor driving unit 300 may provide driving signals having a reversed relationship to the left column (L) and the right column (R) included in the sensing channels 110*a* to 110*d*. As in the illustrated example, the sensor driving unit 300 may synchronize the rising edge of the driving signal provided to the left column (L) with the falling edge of the driving signal provided to the right column (R). The falling edge of the driving signal provided to the left column (L) and the rising edge of the driving signal provided to the right column (R) may be provided to be synchronized with each other. However, the present invention is not limited thereto. For example, in addition, the sensor driving unit 300 may provide a phase difference between driving signals provided to one sensing channel 110 and another adjacent sensing channel.

Meanwhile, the panel 100 may include a plurality of electrodes regularly arranged in rows and columns. The electrodes may be arranged in a first column, a second column, a third column, and a fourth column, respectively. In this regard, the number of the plurality of columns of the electrodes is not limited to four and may be changed depending on the application.

The electrodes arranged in the first column may form the first sensing channel 110*a*. The first sensing channel 110*a* may include a plurality of electrodes 110 to 119 arranged in a plurality of rows. The electrodes arranged in the second column may form the second sensing channel 110*b*. The second sensing channel 110*b* may include a plurality of electrodes 120 to 129 arranged in a plurality of rows. The electrodes arranged in the third column may form the third sensing channel 110*c*. The third sensing channel 110*c* may include a plurality of electrodes 130 to 139 arranged in a plurality of rows. The electrodes arranged in the fourth column may form the fourth sensing channel 110*d*. The fourth sensing channel 110*d* may include a plurality of electrodes 140 to 149 arranged in a plurality of rows. In this regard, the number of a plurality of rows of electrodes is not limited to nine and may be changed depending on the application.

The switch 200 may be connected to the electrodes 110, 120, 130, and 140 arranged in specific columns through connection lines CL1, CL2, CL3, and CL4. The sensor driving unit 300 may be operably coupled to the switch 200. The sensor driving unit 300 may perform a control operation so that a driving signal of a voltage waveform of a specific cycle may be applied to the electrodes 110, 120, 130, and 140.

The connection lines CL1 of the first column may include first to tenth connection lines CL10 to CL19. The connection lines CL2 of the second column may include first to tenth connection lines CL20 to CL29. The connection lines CL3 of the third column may include first to tenth connection lines CL30 to CL39. The connection lines CL3 of the third column may include first to tenth connection lines CL30 to CL39. Lengths of the connection lines CL1, CL2, CL3, and CL4 may be differently set depending on the positions of the electrodes arranged in specific rows.

Figure 2:
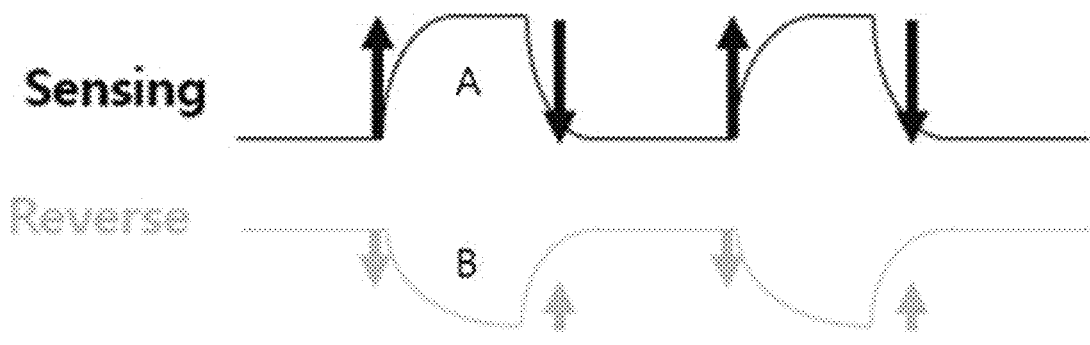
FIG. 2 is a conceptual diagram illustrating that an EMI component of a sensing signal is canceled out.
Figure 3:
FIG. 3 illustrates square wave signals having different slew rates.

Meanwhile, the sensor driving unit 300 may control driving signals between adjacent rows in different ways depending on the amount of EMI radiation of a specific connection line to which a driving signal is applied. In this regard, FIG. 2 is a conceptual diagram illustrating that an EMI component of a sensing signal is canceled out. Meanwhile, FIG. 3 illustrates square wave signals having different slew rates.

Referring to FIG. 2, a driving signal using a reverse method in the form of a reverse voltage of a square wave, which is a sensing waveform, may be used to reduce EMI of a touchscreen. The reverse method is a method of generating an electromagnetic field opposite to the sensing waveform to cancel out EMI.

A driving signal of a voltage waveform of a specific cycle may be formed as a first area (A) between a rising edge and a falling edge. In relation to the reverse method, a second area (B) of a reverse region in a reverse voltage form may be varied to more effectively cancel out a sensing signal.

EMI is mainly generated at the timing of the rising/falling edge of the sensing waveform, and as intensity thereof increases, EMI increases. The reverse method is a method of canceling out EMI by causing the rising edge of the sensing waveform to fall and causing the falling edge of the sensing waveform to rise with the same intensity, and may cancel out EMI using electromagnetic fields opposite to each other.

The reverse method may have different results depending on the design method and implementation. In particular, as the size of the TSP increases, sensing columns have deviations in the same physical properties, which causes deviations in the amount of EMI radiation for each sensing driving column. To compensate therefor, the second area (B) of the reverse voltage waveform corresponding to the sensing driving column may be increased or decreased to cancel out an EMI component of the sensing waveform as much as possible.

Referring to FIG. 3, EMI is closely related to the slew rate of the voltage waveform. As resistance and capacitance values increase, a waveform having a lower slew rate in the form of (a) in FIG. 3 is output. On the other hand, as the capacitance value decreases, a waveform having a higher slew rate in the form of (b) in FIG. 3 is output. When the amount of EMI radiation is compared, the waveform in the form of (b) in FIG. 3, which is the waveform having the higher slew rate, exhibits a greater amount of EMI radiation.

The touch detection device 10 according to the present invention will be described with reference to FIGS. 1 to 3. The touch detection device 10 may be configured so that sensing is sequentially performed from a first row (Row_0)

to a tenth row (Row_9). EMI mainly occurs in a section where the sensing voltage rises/falls. Meanwhile, since a wiring length, a sensor area, etc. are different for each sensor, resistance and capacitance values are differently formed, and thus the amount of EMI radiation is differently formed. This may be a main reason for each sensor not having the same slew rate of the sensing waveform and each sensor exhibiting a deviation in the amount of EMI.

Figure 4:
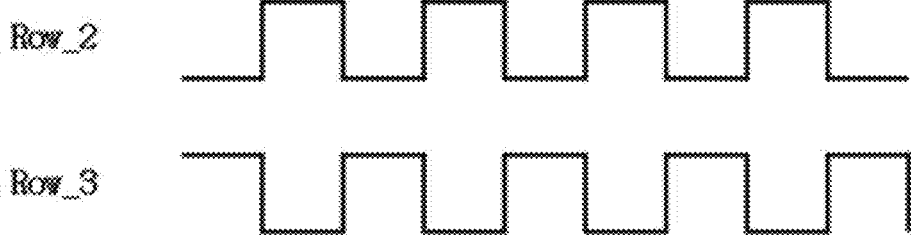
FIG. 4 illustrates a driving voltage of a specific row and a second driving voltage applied to an electrode of a row adjacent to the specific row.

In this regard, FIG. 4 illustrates a driving voltage of a specific row and a second driving voltage applied to an electrode of a row adjacent to the specific row. Meanwhile, FIG. 5 illustrates a driving voltage of a specific row and a second driving voltage and a third driving voltage applied to electrodes of rows on both sides adjacent to the specific row.

Referring to FIG. 4, a second driving signal in the form of a reverse voltage may be applied to a third row (Row_2) adjacent to a second row (Row_1). Referring to FIG. 5, a third driving signal in the form of a reverse voltage may be applied to a ninth row (Row_8) adjacent to an eighth row (Row_7).

Figure 5:
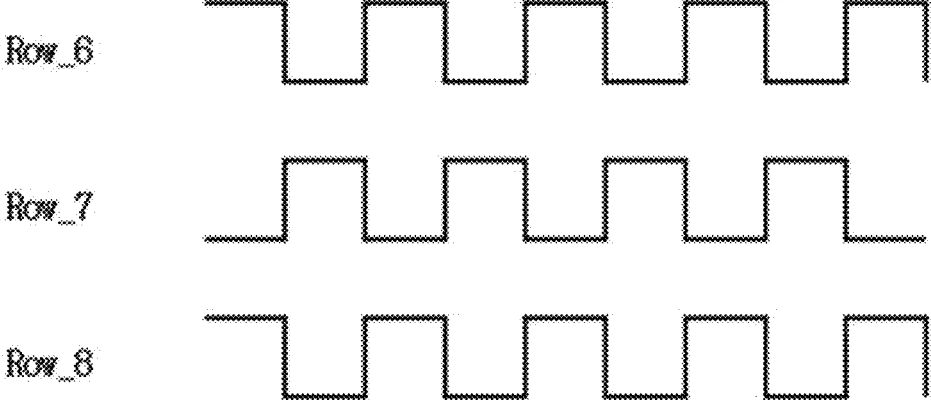
FIG. 5 illustrates a driving voltage of a specific row and a second driving voltage and a third driving voltage applied to electrodes of rows on both sides adjacent to the specific row.

Referring to FIGS. 3 to 5, lengths of connection lines CL17 to CL47 to electrodes 117 to 147 of the eighth row (Row_7) are shorter than lengths of connection lines CL13 to CL43 to the electrodes 113 to 143 of the fourth row (Row_3). Therefore, when a connection line corresponding to a sensor wire is relatively short, resistance of the wire is low, and a slew rate increases due to a decrease in the wire and the surrounding capacitance. As a result, the amount of EMI radiation of the electrodes 117 to 147 of the eighth row (Row_7) increases and exhibits a greater amount of radiation than the amount of EMI radiation of the electrodes 113 to 143 of the fourth row (Row_3).

Therefore, driving signals in the form of reverse voltages using the reverse method may be applied to cancel out EMI radiation. Accordingly, in sensor electrodes arranged in a row where the EMI effect is relatively high, the number of reverse lines, to which reverse voltages are applied, arranged adjacent to each other is increased to obtain an efficient EMI cancelation effect.

Referring to FIG. 4, when sensing driving is performed in a row sensed by a reverse driving method, which is an EMI cancelation method, the sensor driving unit 300 of FIG. 1 may cancel out EMI by driving of a reverse waveform, which is an opposite phase of a sensing waveform, for radiated EMI while performing sensing through output of a driving waveform of Reverse 1 Line in one reverse line on a lower row. For example, sensor electrodes in the second row (Row_2) do not have a large amount of EMI radiation, and thus an effective EMI result may be obtained by Reverse 1 Line. On the other hand, in sensor electrodes in the eighth row (Row_7) having a relatively large amount of EMI radiation, sensor electrodes not only in a lower row but also in an upper row in the sensor driving unit 300 of FIG. 1 may increase an EMI cancelation effect by Reverse 2 Line, in which reverse driving output is performed.

A description will be given of the touch detection device 10 according to the present invention with reference to FIGS. 1 to 5. When the amount of EMI radiation of a specific connection line to which a driving signal is applied is less than or equal to a threshold, the sensor driving unit 300 may apply a second driving signal of a reverse voltage waveform to an electrode in one of two rows adjacent to a specific row. When the amount of EMI radiation of the specific connection line exceeds the threshold, the sensor driving unit 300 may apply the second driving signal and the third driving signal of the reverse voltage waveform to electrodes in the two rows adjacent to the specific row, respectively.

Meanwhile, when a length of a specific connection line is greater than or equal to a critical length, the sensor driving unit 300 may apply the second driving signal of the reverse voltage waveform to an electrode in one of two rows adjacent to a specific row. When the length of the specific connection line is less than the critical length, the sensor driving unit 300 may apply the second driving signal and the third driving signal of the reverse voltage waveform to electrodes in the two rows adjacent to the specific row, respectively.

Meanwhile, when the length of the specific connection line is greater than or equal to the critical length, a driving signal of a voltage waveform may be a square wave signal (see (a) in FIG. 3) having a first slew rate at a rising edge. On the other hand, when the length of the specific connection line is less than the critical length, a driving signal of a voltage waveform may be a square wave signal (see (b) in FIG. 3) having a second slew rate greater than the first slew rate at a rising edge.

The sensor driving unit 300 may detect the rising edge and the falling edge of the driving signal of the voltage waveform for each specific row. When the length of the specific connecting line is greater than or equal to the critical length, the sensor driving unit 300 may perform a control operation so that time points of a second falling edge and a second rising edge of the second driving signal match and correspond to time points of the rising edge and the falling edge of the driving signal of the voltage waveform for each specific row.

When the length of the specific connecting line is less than the critical length, the sensor driving unit 300 may perform a control operation so that time points of the second falling edge and the second rising edge of the second driving signal match and correspond to the time points of the rising edge and the falling edge of the driving signal of the voltage waveform for each specific row. In addition, when the length of the specific connecting line is less than the critical length, the sensor driving unit 300 may perform a control operation so that time points of a third falling edge and a third rising edge of the third driving signal match and correspond to the time points of the rising edge and the falling edge of the driving signal of the voltage waveform for each specific row.

Meanwhile, the sensor driving unit 300 may control the time points of the falling edge and the rising edge, as well as change the second area (B) of the reverse voltage waveform to cancel out an EMI component of the voltage waveform. In this regard, the sensor driving unit 300 may detect the rising edge and the falling edge of the driving signal of the voltage waveform for each specific row. The sensor driving unit 300 may detect the first area between the rising edge and the falling edge. The sensor driving unit 300 may cancel out the EMI component of the voltage waveform by changing the second area of the second driving signal of the reverse voltage waveform to correspond to the first area.

The switch 200 may be implemented using a plurality of switches corresponding to the number of plurality of columns. The switch 200 may include the first switch 210, the second switch 220, the third switch 230, and the fourth switch 240.

The first switch 210 may be connected to the electrodes 110 to 119 in the first column. The second switch 220 may be connected to the electrodes 120 to 129 in the second column adjacent to the first column. The third switch 230 may be connected to the electrodes 130 to 139 in the third column adjacent to the second column. The fourth switch 240 may be connected to the electrodes 140 to 149 in the fourth column adjacent to the third column.

The sensor driving unit 300 may detect a row and column corresponding to a position where touch input is applied to the panel 100. The sensor driving unit 300 may apply driving signals of different voltage waveforms to electrodes in adjacent rows through switches corresponding to detected column among the first to fourth switches 210 to 240. At least one of the driving signals of the different voltage waveforms may be the second driving signal of the reverse voltage waveform.

When the length of the specific connection line is greater than or equal to the critical length, the sensor driving unit 300 may apply the second driving signal of the reverse voltage waveform to a second connection line adjacent to the specific row and shorter than the connection line.

When the length of the specific connection line is less than the critical length, the sensor driving unit 300 may apply the second driving signal of the reverse voltage waveform to the second connection line shorter than the connection line among two rows adjacent to the specific row. When the driving signal and the second driving signal are applied, the sensor driving unit 300 may determine whether the amount of EMI radiation of the specific connection line is greater than or equal to the threshold. When the amount of EMI radiation of the specific connection line is greater than or equal to the threshold, the sensor driving unit 300 may apply the third driving signal of the reverse voltage waveform to a third connection line longer than the connection line among the two rows adjacent to the specific row.

The touch detection device capable of suppressing the EMI effect according to the present invention has been described above. Technical effects of the touch detection device capable of suppressing the EMI effect may be summarized as follows. However, the present invention is not limited thereto.

The present invention provides an advantage in that the EMI effect may be effectively suppressed in the touch detection device.

According to the present invention, it is possible to alleviate a problem that an amount of EMI radiation differs in magnitude for each sensing column since resistance and capacitance components of touch cells in a panel deviate as the panel becomes larger by applying a driving voltage in the form of a reverse voltage to an adjacent column.

According to the present invention, it is possible to provide a method of driving a touch panel capable of reducing an EMI deviation effect in the touch panel by applying a driving voltage in the form of a reverse voltage to an adjacent column.

The effects of the present invention are not limited to those mentioned above, and other tasks not mentioned herein may be clearly understood by those skilled in the art from the above description.

Even though the present invention has been described with respect to specific embodiments of the present invention, these are merely examples and the present invention is not limited thereto. Those skilled in the art to which present invention pertains may change or modify the described embodiments without departing from the scope of the present invention, and various modifications and variations are possible within the scope of the technical idea of the present invention and the equivalent scope of the patent claims to be described below.

The invention claimed is:

1. A touch detection device comprising:
   a panel including a plurality of electrodes regularly arranged in rows and columns;

a switch connected to electrodes arranged in one of the columns through connection lines including a first connection line and a second connection line; and
   a sensor driving unit operably coupled to the switch and configured to perform a control operation such that a driving signal of a voltage waveform of a specific cycle is applied to the electrodes arranged in the one of the columns, wherein:
lengths of the connection lines are differently set according to positions of electrodes arranged in each of the rows, and
the sensor driving unit is configured to:
apply a second driving signal of a reverse voltage waveform to an electrode of one of two rows adjacent to one of the rows when an amount of electromagnetic interference (EMI) radiation of the first connection line to which the driving signal is applied is less than or equal to a threshold, and
apply the second driving signal and a third driving signal of the reverse voltage waveform to electrodes of the two rows adjacent to the one of the rows, respectively, when the amount of EMI radiation of the first connection line exceeds the threshold.

2. The touch detection device according to claim 1, wherein the sensor driving unit is configured to:
apply the second driving signal of the reverse voltage waveform to the electrode of the one of the two rows adjacent to the one of the rows when a length of the first connection line is greater than or equal to a critical length, and
apply the second driving signal and the third driving signal of the reverse voltage waveform to the electrodes of the two rows adjacent to the one of the rows, respectively, when the length of the first connection line is less than the critical length.

3. The touch detection device according to claim 2, wherein:
when the length of the first connection line is greater than or equal to the critical length, the driving signal of the voltage waveform is a square wave signal having a first slew rate at a rising edge, and
when the length of the first connection line is less than the critical length, the driving signal of the voltage waveform is a square wave signal having a second slew rate greater than the first slew rate at a rising edge.

4. The touch detection device according to claim 3, wherein the sensor driving unit is configured to:
detect a rising edge and a falling edge of the driving signal of the voltage waveform for each row, and
perform a control operation such that time points of a second falling edge and a second rising edge of the second driving signal match and correspond to time points of the rising edge and the falling edge of the driving signal of the voltage waveform for each row when the length of the first connection line is greater than or equal to the critical length.

5. The touch detection device according to claim 3, wherein the sensor driving unit is configured to:
detect a rising edge and a falling edge of the driving signal of the voltage waveform for each row,
perform a control operation such that time points of a second falling edge and a second rising edge of the second driving signal match and correspond to time points of the rising edge and the falling edge of the driving signal of the voltage waveform for each row when the length of the first connection line is less than the critical length, and perform a control operation such that time points of a third falling edge and a third rising edge of the third driving signal match and correspond to time points of the rising edge and the falling edge of the driving signal of the voltage waveform for each row when the length of the first connection line is less than the critical length.

6. The touch detection device according to claim 3, wherein the columns include a first column, a second column, a third column, and a fourth column, and the switch includes:

a first switch connected to electrodes of the first column;

a second switch connected to electrodes of the second column adjacent to the first column;

a third switch connected to electrodes of the third column adjacent to the second column; and a fourth switch connected to electrodes of the fourth column adjacent to the third column.

7. The touch detection device according to claim 6, wherein:

the sensor driving unit is configured to:

detect a row and a column corresponding to a position where touch input is applied to the panel, and apply driving signals of different voltage waveforms to electrodes in adjacent rows of the detected row through switches corresponding to the detected column among the first to fourth switches, and at least one of the driving signals of the different voltage waveforms is the second driving signal of the reverse voltage waveform.

8. The touch detection device according to claim 7, wherein, when the length of the first connection line is greater than or equal to the critical length, the sensor driving unit applies the second driving signal of the reverse voltage waveform to the second connection line adjacent to the one of the rows and shorter than the first connection line.

9. The touch detection device according to claim 8, wherein the connection lines further includes a third connection line, and wherein the sensor driving unit is configured to:

apply the second driving signal of the reverse voltage waveform to the second connection line adjacent to the one of the rows and shorter than the first connection line when the length of the first connection line is less than the critical length, determine whether the amount of EMI radiation of the first connection line is greater than or equal to the threshold when the driving signal and the second driving signal are applied, and apply the third driving signal of the reverse voltage waveform to the third connection line adjacent to the one of the rows and longer than the first connection line when the amount of EMI radiation of the first connection line is greater than or equal to the threshold.

10. The touch detection device according to claim 1, wherein the sensor driving unit is configured to:

detect a rising edge and a falling edge of the driving signal of the voltage waveform for each row, detect a first area between the rising edge and the falling edge, and cancel out an EMI component of the voltage waveform by changing a second area of the second driving signal of the reverse voltage waveform to correspond to the first area.

* * * * *